United States Patent Office 3,539,542
Patented Nov. 10, 1970

3,539,542
PROCESS FOR PRODUCING α-METHYL-ACRYLONITRILE POLYMERS
Kazuo Nakatsuka, Fumio Ide, Yasushi Joh, and Yahide Kotake, Ohtake-shi, Japan, assignors to Mitsubishi Rayon Co., Ltd., Tokyo, Japan, a corporation of Japan
Filed Mar. 14, 1968, Ser. No. 713,016
Claims priority, application Japan, Dec. 1, 1967, 42/77,132
Int. Cl. C08f 3/78, 15/22
U.S. Cl. 260—85.5                          11 Claims

ABSTRACT OF THE DISCLOSURE

Highly crystalline α-methylacrylonitrile polymers and copolymers are obtained by the polymerization of α-methylacrylonitrile using a novel organometallic catalyst having in its molecule at least one hydrocarbon radical and at least one secondary amino radical or a substituted mercapto radical. The catalyst is an organometallic compound represented by the general formula $$R_xM_{II}[AlR'_4]_{2-x}$$

Figure 1:
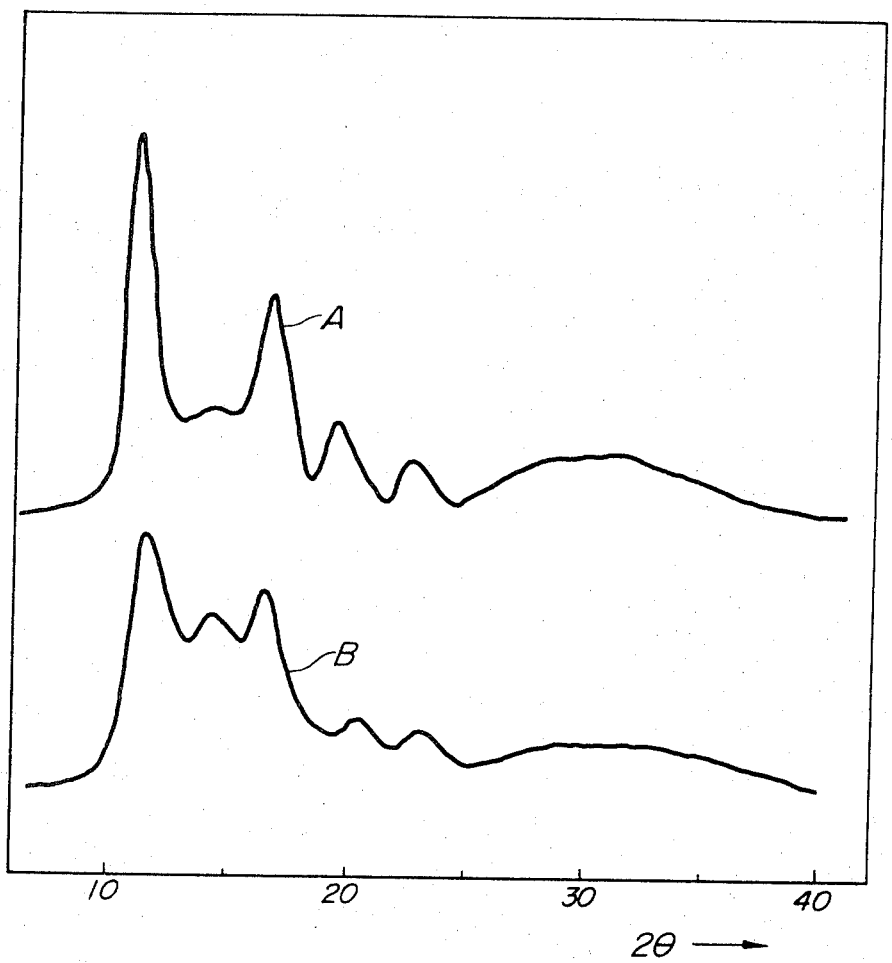

wherein $M_{II}$ is Be, Mg, Ca, Sr, Zn, or Cd, R and R' which may be same or different are individually a hydrocarbon radical, a hydrogen atom, a secondary amino radical or a substituted mercapto radical. The crystalline α-methylacrylonitrile polymers or copolymers may also be obtained by subjecting said monomer to a polymerization in a specific organic solvent in the presence of the above-mentioned catalyst.

---

This invention relates to a process for producing highly crystalline polymers having a stereoregular structure from α-methylacrylonitrile.

It is well known that polymers can be obtained by polymerizing α-methylacrylonitrile in the presence of a radical initiator or an anionic catalyst. These polymers are non-crystalline according to X-ray diffraction measurement and possess high solubility. They are soluble in various organic solvents such as acetone, acetic anhydride, dimethylformamide, cyclohexanone, ethyl acetoacetate, benzonitrile, furfural, nitromethane, nitropropane and pyridine, and dissolve at elevated temperatures in methylethylketone, methylene chloride and the like. These polymers are higher in thermoplasticity than polyacrylonitrile but have various drawbacks. For example, the polymers have such fatal drawbacks that they have softening points ordinarily at about as low as 100°–120° C. and hence are limited in thermal resistance, and that when heated to above 100° C., they are colored to yellow or to red. Due to such drawbacks, they fail to find practical uses as synthetic resins and synthetic fibers.

As a new type of poly-α-methylacrylonitrile, a crystalline poly-α-methylacrylonitrile has been desired. For the production thereof, however, there have been proposed only the processes disclosed in the paper by Natta et al. ["Chim. e Ind.," (Milano) 46 1429 (1964)] and in the patents by Natta et al. (Belgian Pat. 611,491 and British Pat. 934,469). According to these processes, organometallic compounds such as, for example, diethylmagnesium, diphenylmagnesium and diethylberyllium are used as stereoregular polymerization catalysts for α-methylacrylonitrile. These catalysts are white crystals and are insoluble in such solvent as toluene, benzene or heptane. Accordingly, the polymerization in accordance with the above processes proceeds by the contact of the insoluble catalyst which is present heterogeneously in a reaction solvent with the monomer dissolved in the solvent.

An object of the present invention is to provide a process for producing highly crystalline α-methylacrylonitrile polymers in high yields by use of novel polymerization catalysts.

Another object is to provide a process for producing highly crystalline α-methylacrylonitrile polymers by use of polymerization catalysts which are dissolved in reaction solvents to make the polymerization proceed smoothly.

A further object is to provide a process for producing crystalline α-methylacrylonitrile polymers excellent in thermal resistance.

In accordance with the present invention, there is provided a process for producing crystalline α-methylacrylonitrile polymers, characterized in that α-methylacrylonitrile or a mixture of α-methylacrylonitrile with a monomer copolymerizable therewith is polymerized in the presence of at least one organometallic compound catalyst represented by the general formula $$R_xM_{II}[AlR'_4]_{2-x}$$

wherein $M_{II}$ is any of Be, Mg, Ca, Sr, Zn and Cd, R and R' which may be same or different are individually a hydrocarbon radical, a hydrogen atom, a secondary amino residue or a substituted mercapto radical, and $x$ is 0 or 1, said compound having in its molecule at least one hydrocarbon radical and at least one secondary amino radical or substituted mercapto radical.

Of the catalysts involved in the present invention, magnesium-containing compounds, i.e. catalysts represented by the general formula $$R_xMg[AlR'_4]_{2-x}$$

wherein R, R' and $x$ are as defined above, are particularly effective for the stereoregular polymerization of α-methylacrylonitrile.

Concrete examples of the catalysts employed in the present invention are compounds of the following formulas:

EtMg[AlEt$_3$(NPh$_2$)]        EtMg[AlEt$_2$(NPh$_2$)$_2$]
EtMg[AlEt(NPh$_2$)$_3$]        EtMg[AlEt$_3$NEt$_2$]

EtMg[AlEt$_2$(NMe$_2$)$_2$]    EtMg[AlEt$_3$N]

EtMg[AlEt$_2$(N)$_2$]    EtMg[AlEt$_3$N]

EtMg[AlEt$_2$(NO)$_2$]    EtMg[AlEt$_3$NS]

EtMg[AlEt$_2$(N—CH$_2$Ph$_2$)$_2$]    Ph$_2$NMg[AlEt$_3$(NPh$_2$)]

i-BuMg[Al(iBu)$_3$(NEt$_2$)]

PhBe[AlEt$_2$(NPh$_2$)$_2$]

EtSr[AlEt$_3$(NEt$_2$)]

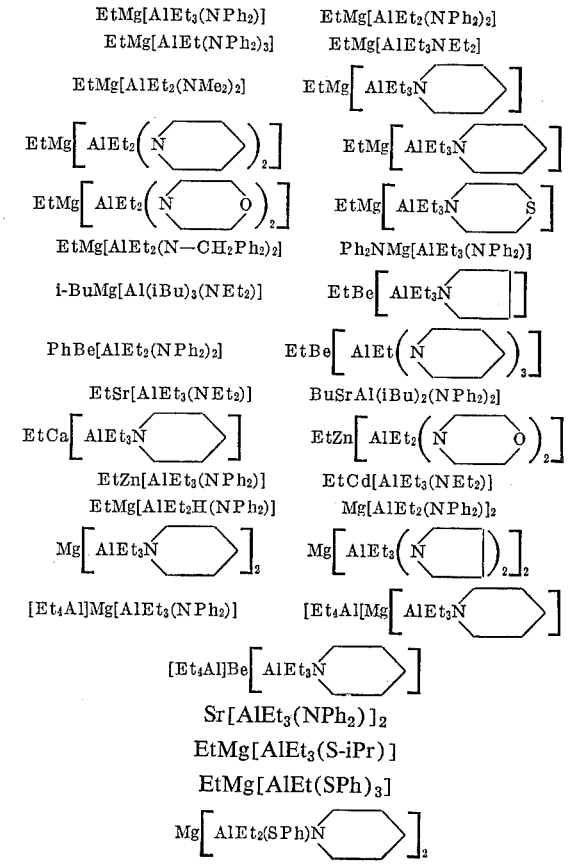

EtMg[Al(S-iPr)₄]

Be[AlEt₃(NPh₂)]₂

Ca[AlEt₃(NPh₂)]₂

EtMg[AlEt₃(SPh)]

Mg[AlEt₃(S-iPr)]₂ iPr-SMg[AlEt₃(NPh₂)]

In these formulas, Ph, Et, Bu, Me and iPr represent phenyl, ethyl, butyl, methyl and isopropyl radicals, respectively.

Among these catalysts, those containing a secondary amino radical selected from the class consisting of diphenylamino, diethylamino, hexahydropyridino and tetrahydropyrrolo radicals particularly give polymers with high stereoregularity. Further, catalysts containing a substitute mercapto radical having 3–12 carbon atoms can also give polymers which indicate high stereoregularity by X-ray patterns. As the hydrocarbon radical in the catalyst, an ethyl radical is advantageous. In the present invention, the most advantageous are catalysts represented by the general formula

EtMg[AlEt₃N(R″R‴)]

wherein R″ and R‴ are hydrocarbon radicals and can form a heterocyclic ring together with a nitrogen atom.

According to the explanation by Ziegler (Zeiss; Organometallic Chemistry, Reinhold Publishing Corp. (1960)), the structure of the catalyst employed in the present invention, for example, EtMg[AlEt₃NPh₂], is considered to be as follows:

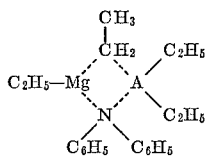

In the polymerization, any of the catalysts which have previously been synthesized may be used. Alternatively, however, the polymerization may be effected in such a manner that the catalyst is synthesized in situ by reacting two kinds of starting organometallic components in the presence or absence of a suitable solvent, followed by adding the monomer without separation of the product. For example, the polymerization may be effected by adding the monomer to the EtMg[AlEt₃(NPh₂)] which is synthesized either by reacting in toluene Et₂Mg with an equimolar amount of AlEt₂NPh₂ or by reacting EtMg(AlEt₄), which is prepared from Et₂Mg and AlEt₃, with an equimolar amount of diphenyl amine in toluene.

What is of importance here is the significance of the secondary amino radical or substituted mercapto radical in said organometallic compound. That is, it has unexpectedly been found that a polymerization product obtained by use of, like in the present invention, an organometallic compound having in the molecule at least one hydrocarbon radical and at least one secondary amino radical or substituted mercapto radical has surprisingly been increased in crystallinity as compared with a polymerization product obtained by use of a same type organometallic compound of the aforesaid general formula in which both R and R′ are hydrocarbon radicals. A comparison in crystallinity between, for example, a polymerization product obtained by use of EtMg[AlEt₄] and one obtained by use of EtMg[AlEt₃NPh₂] is shown in FIG. 1. It is noteworthy, though the reason therefor is not clear, that when one or more of hydrocarbon radicals is substituted by secondary amino radical or substituted mercapto radical, the resulting polymer is greatly increased in crystallinity.

The stereoregular polymerization in accordance with the present invention is applicable not only to the homopolymerization of α-methylacrylonitrile but also to the copolymerization thereof with other copolymerizable monomers. Such copolymerizable monomers include, for example, vinylpyridines, acrylic acid esters, vinylpyrrolidone, and epoxy compounds such as propylene oxide and epichlorohydrin. Particularly, 4-vinylpyridine is high in copolymerizability.

In the practice of the present invention, the molar ratio of monomer to catalyst is variable with a wide range, but is preferably between 10:1 and 200:1, in general. The polymerization may be effected in bulk in the absence of solvent, but is preferably carried out in the presence of an inert solvent. As such solvents, ethers such as dioxane, tetrahydrofuran and anisole are most preferable. It is also possible to use aromatic hydrocarbons such as benzene and toluene, and aliphatic hydrocarbons such as hexane and heptane. Among them, toluene is particularly preferred. Further, mixtures of aromatic hydrocarbons with the aforesaid ethers may also be used with advantages.

The polymerization can usually be effected at the temperature between −50° and 150° C., preferably between 40° and 150° C. After the polymerization, reaction system is poured into methanol containing a small amount of hydrochloric acid to decompose the catalyst, whereby a colorless powdery polymer is obtained. When the polymer obtained according to the present invention is extracted with a polar solvent such as acetone or dimethylformamide, an amorphous portion of the polymer can be removed. When the ratio of acetone insoluble portion to total polymer is represented by percentage and is used as a measure of stereoregularity, it is well understood that the higher the polymerization temperature, the higher the stereoregularity of the polymer and also the higher the molecular weight thereof. According to X-ray analysis, the acetone insoluble portion is crystalline.

The crystalline poly-α-methylacrylonitriles obtained in accordance with the present invention do not dissolve in common organic solvents, unlike the conventional amorphous polymers. That is, most of them are insoluble in carbon disulfide, acetone, methylethylketone, benzonitrile, acetophenone, dimethylformamide and dimethyl sulfoxide. However, these crystalline polymers are easily soluble in protic solvent such as nitric, sulfuric, dichloroacetic, trichloroacetic and trifluoroacetic acids. Accordingly, the viscosities thereof can be measured in, for example, a dichloroacetic acid solution.

The crystalline polymers in accordance with the present invention have such characteristic that they are markedly high in thermal resistance. That is, they have softening points at 200° C. and above, though the values depends on the degree of the crystallinity, and at temperatures of 180° C. and below, they are quite stable at temperature of 180° C. or below and are not colored at these temperature. In other words, the crystalline polymers by the present invention have been greatly improved in thermal resistance, which has been the greatest drawback of the conventional amorphous poly-α-methylacrylonitriles, and thus are highly promising as materials for practical uses. For example, these crystalline polymers can be shaped into fibers or films by dissolving them in such solvents as sulfuric, nitric and dichloroacetic acids and then subjecting the solutions to wet spinning according to ordinary procedures. The resulting fibers have specific physical and chemical properties which are not seen in existing synthetic fibers.

The following examples illustrate the present invention. In the examples, the intrinsic viscosity [η] is measured in dichloroacetic acid solution at 30° C.

EXAMPLE 1

Figure 2A:
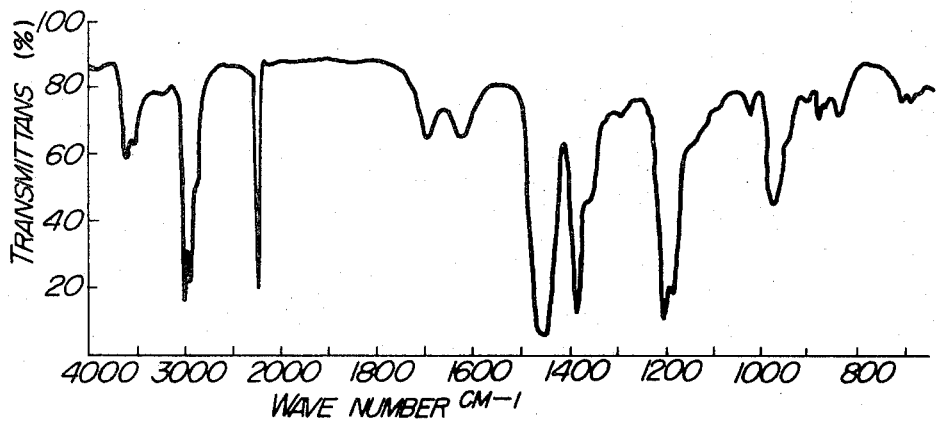
Figure 2B:
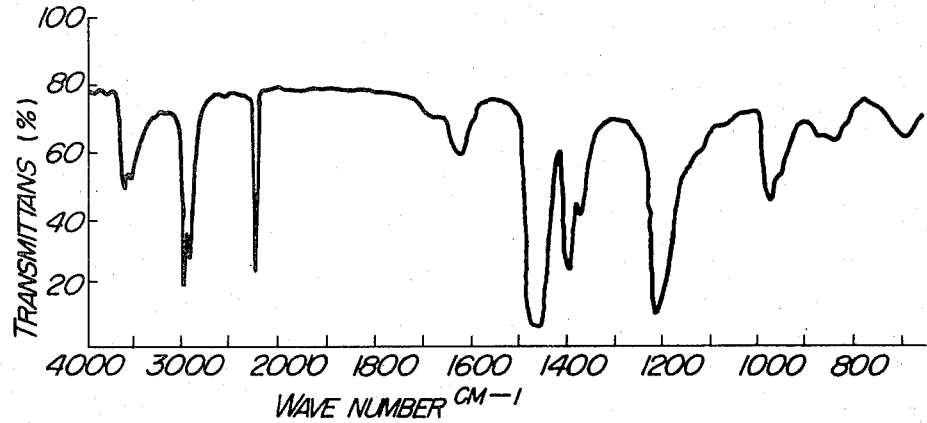

In a nitrogen atmosphere, 270 ml. of purified toluene was charged into a 500 ml. 3-necked flask provided with a stirrer and a reflux condenser, and 0.006 mole of EtMg [AlEt₃(NPh₂)] was added thereto. The mixture was maintained at 70° C., and 30 ml. of pure α-methylacrylonitrile was added thereto with stirring. Simultaneously with the addition of the monomer, the mixture became reddish and, after a short period of time, a gelatinous precipitate began to form. After 5 hours, the content of the flask was poured into about 1 l. of methanol containing 2-5% of hydrochloric acid. When the precipitate had become completely white, the supernatant was removed by decantation, and the precipitate was isolated by filtration, was thoroughly washed with a large amount of methanol and was then dried to obtain 9.3 g. of a polymer. Infrared absorption spectrum of this polymer was shown in FIG. 2A in which absorptions due to crystallinity are observed at 1192, 910, 882, 873, 711 and 690 cm.$^{-1}$, unlike the case of a control radical polymerization product, the infrared absorption spectrum of which is shown in FIG. 2B. As to physical properties, the polymer obtained by present examples was substantially insoluble in acetone, acetic anhydride, cyclohexanone, ethyl acetoacetate, furfural, nitromethane, nitropropane and methylene chloride which have heretofore been considered as solvents for conventional poly-α-methylacrylonitrile. For example, when the polymer was extracted with acetone, only a minor part of the polymer was extracted. The part extracted was an amorphous portion of the polymer. 76% of the total polymer was isolated as residue which gave the highly crystalline X-ray diffraction pattern shown in FIG. 1A.

A polymer was obtained under entirely the same conditions as above, except that EtMg[AlEt$_4$] was used as the catalyst instead of EtMg[AlEt$_3$(NPh)]. This polymer gave the X-ray diffraction pattern as shown in FIG. 1B. When FIG. 1A is compared with FIG. 1B, it is well understood that the polymer obtained according to the present invention has been greatly increased in crystallinity.

The thus obtained crystalline poly-α-methylacrylonitrile was soluble not only in nitric and sulfuric acids but also in dichloroacetic, trichloroacetic and trifluoroacetic acids, and had an intrinsic viscosity of 3.62. When this crystalline polymer is dissolved in nitric acid and is subjected to wet spinning according to ordinary procedures, fibers excellent in properties can be obtained.

EXAMPLE 2

Polymerization of α-methylacrylonitrile was effected in the same manner as in Example 1, except that 0.005 mole of EtMg[AlEt$_2$(NPh$_2$)$_2$] was used in place of 0.006 mole of EtMg[AlEt$_3$(NPh$_2$)] and a polymerization temperature of 90° C. was adopted in place of 70° C. As the result, 10.7 g. of a polymer was obtained. When the polymer was extracted with acetone, 87% thereof was an insoluble portion. This insoluble portion gave a crystalline X-ray diffraction pattern, and the crystalline portion had an intrinsic viscosity of 5.26.

EXAMPLE 3

Polymerization of α-methylacrylonitrile was effected in the same manner as in Example 1, except that EtMg[AlEt$_3$(NEt$_2$)]

was used in place of EtMg[AlEt$_3$(NPh$_2$)], to obtain 7.5 g. of poly-α-methylacrylonitrile. When this polymer was extracted with acetone, the insoluble portion thereof was 71%. The acetone insoluble portion had an intrinsic viscosity of 3.66, was highly crystalline, and showed almost comparable crystallinity as that in Example 1.

EXAMPLE 4

In a nitrogen atmosphere, 0.006 mole of diethylmagnesium was charged into a 500 ml. separable flask provided with a reflux condenser and a stirrer. To the flask, 0.006 mole of diphenylamino diethylaluminum was added, and the mixture was maintained at 70° C. for 3 hours, whereby the crystals of diethylmagnesium were dissolved and the mixture became a homogeneous solution. This is ascribable to the fact that MgEt$_2$ reacted with AlEt$_2$NPh$_2$ to form a soluble complex. To the solution, 270 ml. of toluene was added and then 30 ml. of α-methylacrylo-nitrile was added at 70° C. 4 hours thereafter, the content of the flask was poured into about 1 l. of methanol containing 5% of hydrochloric acid to decompose the catalyst. As the result, 8.0 g. of a polymer was obtained, and 64.8% thereof was acetone insoluble and was highly crystalline.

EXAMPLE 5

Polymerization was effected in entirely the same manner as in Example 1, except that as the catalyst, EtMg[AlEt$_2$H(NPh$_2$)]

was used in place of EtMg[AlEt$_3$NPh$_2$], whereby 6.8 g. of a polymer was obtained. 70.2% of the polymer was acetone insoluble and was highly crystalline by X-ray diffraction measurement.

EXAMPLE 6

Polymerization was effected in entirely the same manner as in Example 1, except that tetrahydrofuran was used as the solvent and

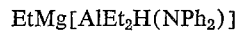

was used as the catalyst, whereby 8.7 g. of a polymer was obtained. The proportion of the acetone insoluble portion of the polymer was 80.2% based on the total polymer. The acetone insoluble portion was obviously crystalline.

EXAMPLE 7

Polymerization was effected in the same manner as in Example 1, except that as the solvent, anisole was used in place of toluene and

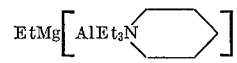

was used as the catalyst, whereby 15.4 g. of a polymer was obtained. The proportion of the acetone insoluble portion to the total polymer was 83%. The acetone insoluble portion was obviously crystalline according to X-ray analysis, and had an intrinsic viscosity of 4.14.

EXAMPLE 8

300 ml. of toluene was charged into a 500 ml. separable flask provided with a reflux condenser and a stirrer, and 0.005 mole of EtZn[AlEt$_3$NPh$_2$] was added thereto in a nitrogen atmosphere. The mixture was maintained at 80° C., and 30 ml. of α-methylacrylonitrile was added dropwise with stirring, whereby polymerization was initiated and a red precipitate was formed. 7 hours thereafter, the content of the flask was poured into 1 l. of methanol containing 3% of hydrochloric acid and was allowed to stand overnight to obtain 7.7 g. of a white polymer. The infrared absorption spectrum for the thus obtained polymer did not differ substantially from that for a polymer obtained according to Example 1. The crude polymer was extracted with acetone to find that 60% thereof was insoluble and was crystalline according to X-ray analysis. The acetone insoluble portion had an intrinsic viscosity of 2.41, and the polymer was substantially the same in physical properties as that obtained in Example 1.

EXAMPLE 9

Polymerization was effected in entirely the same manner as in Example 8, except that as the catalyst,

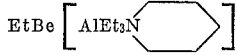

was used in place of EtZn[AlEt$_3$(NPh$_2$)], whereby 5.4 g. of poly-α-methylacrylonitrile was obtained. The properties of the thus obtained polymer were almost the same as in Example 1.

EXAMPLE 10

Polymerization was effected in entirely the same manner as in Example 8, except that as the catalyst, EtCa[AlEt$_3$(NPh$_2$)]

was used in place of EtZn[AlEt₃(NPh₂)], whereby 4.3 g. of poly-α-methylacrylonitrile was obtained. 56% of the thus obtained polymer was acetone insoluble and was crystalline.

EXAMPLE 11

Polymerization was effected in entirely the same manner as in Example 8, except that EtSr[AlEt₃(NPh₂)] was used as the catalyst, whereby 4.0 g. of a polymer was obtained. 51% of the thus obtained polymer was crystalline.

EXAMPLE 12

Polymerization was effected in entirely the same manner as in Example 1, except that Ph₂NMg[AlEt₂(NPh₂)₂] was used as the catalyst, whereby 8.1 g. of a polymer was obtained. 5.7 g. of the thus obtained polymer was acetone insoluble and was crystalline.

EXAMPLE 13

In a nitrogen atmosphere, 270 ml. of toluene and 0.006 mole of

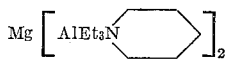

were charged into a 500 ml. separable flask provided with a reflux condenser and a stirrer, and the mixture was maintained at 90° C. To the mixture, 30 ml. of α-methylacrylonitrile was added dropwise whereby polymerization took place. After 1 hour, the reaction product was poured into hydrochloric acid-acidified methanol to decompose the catalyst, whereby 20 g. of a polymer was obtained. The polymer was extracted with acetone to find that 90% thereof was insoluble. The degree of crystallinity of the insoluble portion was 53%.

For comparison, entirely the same polymerization as above was effected, except that Mg[AlEt₄]₂ was used as the catalyst, whereby 15 g. of a polymer was obtained. The polymer was extracted with acetone to find that 82% thereof was insoluble. The degree of crystallinity of the insoluble portion was 31%.

EXAMPLE 14

Polymerization was effected in the same manner as in Example 13, except that

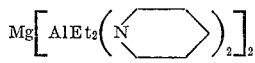

was used as the catalyst and an equal amount mixture of toluene and anisole was used as the solvent, whereby 23 g. of a highly crystalline polymer was obtained. The degree of crystallinity of the thus obtained polymer was 62%.

For comparison, the same polymerization as above was effected, except that Mg[AlEt₄]₂ was used as the catalyst, whereby 19.6 g. of a polymer was obtained. The degree of crystallinity of the thus obtained polymer was 36%.

EXAMPLE 15

Polymerization was effected in the same manner as in Example 13, except that [Et₄Al]Mg[AlEt₃NPh₂] was used as the catalyst, whereby 23.5 g. of a polymer was obtained. The degree of crystallinity of the polymer was 53%.

EXAMPLE 16

Polymerization was effected in entirely the same manner as in Example 13, except that

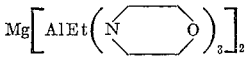

was used as the catalyst, whereby 24 g. of a polymer was obtained. The degree of crystallinity of the polymer was 46%.

EXAMPLE 17

Polymerization was effected for 3 hours in the same manner as in Example 13, except that dioxane was used as the solvent and Be[AlEt₃NPh₂]₂ was used as the catalyst, whereby 20.3 g. of a polymer was obtained. The degree of crystallinity of the polymer was 39%.

The same polymerization as above was effected, except that Be[AlEt₄]₂ was used as the catalyst, whereby 18.0 g. of a polymer was obtained. The degree of crystallinity of the polymer was 20.6%.

EXAMPLE 18

Polymerization was effected in entirely the same manner as in Example 17, except that

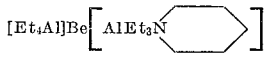

was used as the catalyst, whereby 22.5 g. of a polymer was obtained. The degree of crystallinity of the polymer was 52%.

EXAMPLE 19

Polymerization was effected in the same manner as in Example 17, except that Sr[AlEt₃NEt₂]₂ was used as the catalyst and toluene was used as the solvent, whereby 18 g. of a highly crystalline polymer was obtained.

EXAMPLE 20

Polymerization was effected in entirely the same manner as in Example 1, except that EtMg[AlEt₃—iPr] was used as the catalyst. The yield was 78%. The resulting polymer had a degree of crystallinity of 49%.

EXAMPLE 21

Polymerization was effected in the same manner as in Example 13, except that Mg[AlEt₃SPh]₂ was used as the catalyst, whereby 21 g. of a polymer was obtained. The degree of crystallinity of the polymer was 52%.

EXAMPLE 22

Polymerization was effected in the same manner as in Example 13, except that

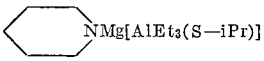

was used as the catalyst, whereby 24 g. of a crystalline polymer was obtained. The degree of crystallinity of the polymer was 47%.

EXAMPLE 23

Polymerization was effected in the same manner as in Example 17, except that Cd[AlEt₃NEt₂]₂ was used as the catalyst, whereby 16 g. of a crystalline polymer was obtained.

EXAMPLE 24

240 ml. of purified toluene was charged into a nitrogen-flushed 500 ml. 3-necked flask provided with a stirrer and a cooler, and 0.005 mole of

Figure 3:
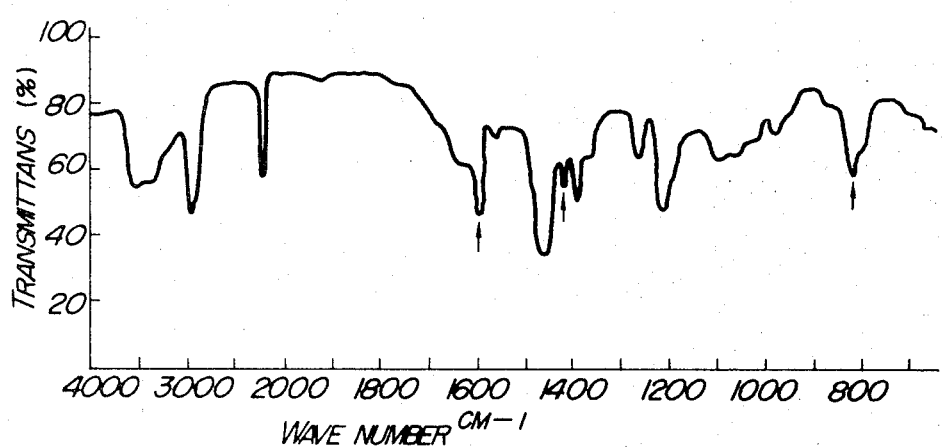

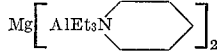

was added thereto. The mixture was maintained at 70° C., and 60 ml. of an equal volume mixture of α-methylacrylonitrile and 4-vinylpyridine was added dropwise to the flask, whereby a red polymer began to precipitate simultaneously with the addition. After 5 hours the content of the flask was poured into about 1 l. of methanol containing 3% of hydrochloric acid to decompose the catalyst. After allowing the mixture to stand overnight, a precipitated white polymer was isolated by filtration, was washed with a large amount of methanol and then with an aqueous dilute alkali solution, was thoroughly washed with water until the filtrate had become neutral, and was then dried to obtain 18.9 g. of a polymer. The thus obtained polymer was extracted with methanol for 24 hours in a Soxhlet extractor to remove a homopolymer of 4-vinylpyridine. Further, the methanol insoluble fraction was extracted with acetone for 24 hours to remove non-crystalline portion of the copolymer, whereby 13.6 g. of a residue was obtained. According to X-ray analysis, the residue was crystalline, and in its infrared absorption spectrum, absorptions due to 4-vinylpyridine were observed as shown in FIG. 3.

We claim:

1. A process for producing crystalline α-methylacrylonitrile polymers, characterized in that a polymerization of a member selected from the class consisting of α-methylacrylonitrile and a mixture of at least 50% by volume α-methylacrylonitrile with the remainder being a monomer copolymerizable therewith is carried out in the presence of a catalytic amount of at least one organometallic compound having in its molecule at least one hydrocarbon radical and at least one radical selected from the class consisting of secondary amino radicals and substituted mercapto radicals, said organometallic compound being represented by the general formula $$R_xM_{II}[AlR'_4]_{2-x}$$

wherein $M_{II}$ is a metal selected from the class consisting of Be, Mg, Ca, Sr, Zn and Cd, R and R' each are radicals selected from the class consisting of hydrocarbon radicals, hydrogen atom, secondary amino radicals and substituted mercapto radicals, and $x$ is selected from the class consisting of 0 and 1.

2. A process according to claim 1, wherein the polymerization is effected by using as a solvent at least one ether selected from the class consisting of anisole, dioxane and tetrahydrofuran.

3. A process according to claim 1, wherein the polymerization is effected by using an aromatic hydrocarbon as a solvent.

4. A process according to claim 1, wherein the polymerization is effected by using as a solvent a mixture comprising an aromatic hydrocarbon and at least one ether selected from the class consisting of anisole, dioxane and tetrahydrofuran.

5. A process according to claim 1, wherein the polymerization is effected at a temperature from 40° to 150° C.

6. A process according to claim 1, wherein the copolymerizable monomer is 4-vinylpyridine.

7. A process for producing crystalline α-methylacrylonitrile polymers, characterized in that a polymerization of a member selected from the class consisting of α-methylacrylonitrile and a mixture of at least 50% by volume α-methylacrylonitrile with the remainder being a monomer copolymerizable therewith is carried out in the presence of a catalytic amount of at least one organometallic compound having in its molecule at least one hydrocarbon radical and at least one radical selected from the class consisting of secondary amino radicals and substituted mercapto radicals, said organometallic compound being represented by the general formula $$R_xMg[AlR'_4]_{2-x}$$

wherein R and R' each are radicals selected from the class consisting of hydrocarbon radicals, hydrogen atom, secondary amino radicals and substituted mercapto radicals, and $x$ is selected from the class consisting of 0 and 1.

8. A process according to claim 7, wherein the polymerization is effected in the presence of an organometallic compound having a secondary amine radical selected from the class consisting of diphenylamino, diethylamino, hexahydropyridino and tetrahydropyriolo radicals.

9. A process according to claim 7, wherein the polymerization is effected in the presence of an organometallic compound having a substituted mercapto radical containing 3 to 12 carbon atoms.

10. A process for producing crystalline α-methylacrylonitrile polymers, characterized in that a polymerization of a member selected from the class consisting of α-methylacrylonitrile and a mixture of at least 50% by volume of α-methylacrylonitrile with the remainder being a monomer copolymerizable therewith is subjected to polymerization in at least one ether selected from the class consisting of anisole, dioxane and tetrahydrofuran in the presence of a catalytic amount of at least one organometallic compound represented by the general formula $$EtMg[AlEt_3N(R'', R''')]$$

wherein Et is an ethyl radical, and R'' and R''' each are hydrocarbon radicals and may form a heterocyclic ring together with a nitrogen atom.

11. A process according to claim 1, wherein the amount of catalyst is one mole per 10 moles to 200 moles of the monomer.

References Cited

UNITED STATES PATENTS

| | | |
|---|---|---|
| 2,640,049 | 5/1953 | Rothrock. |
| 3,231,552 | 1/1966 | Natta et al. _____ 260—88.7 |
| 3,380,979 | 4/1968 | Chiang _____ 260—88.7 |
| 3,448,092 | 6/1969 | Chiang _____ 260—85.5 |

HARRY WONG, Jr., Primary Examiner

U.S. Cl. X.R.

260—29.1, 30.2, 30.8, 31.2, 32.4, 32.6, 32.8, 33.8, 88.7